Sept. 22, 1964     A. GLÜCK     3,149,533

GEAR FINISHING MACHINE

Filed Oct. 19, 1959     2 Sheets-Sheet 1

INVENTOR.
ALFRED GLÜCK

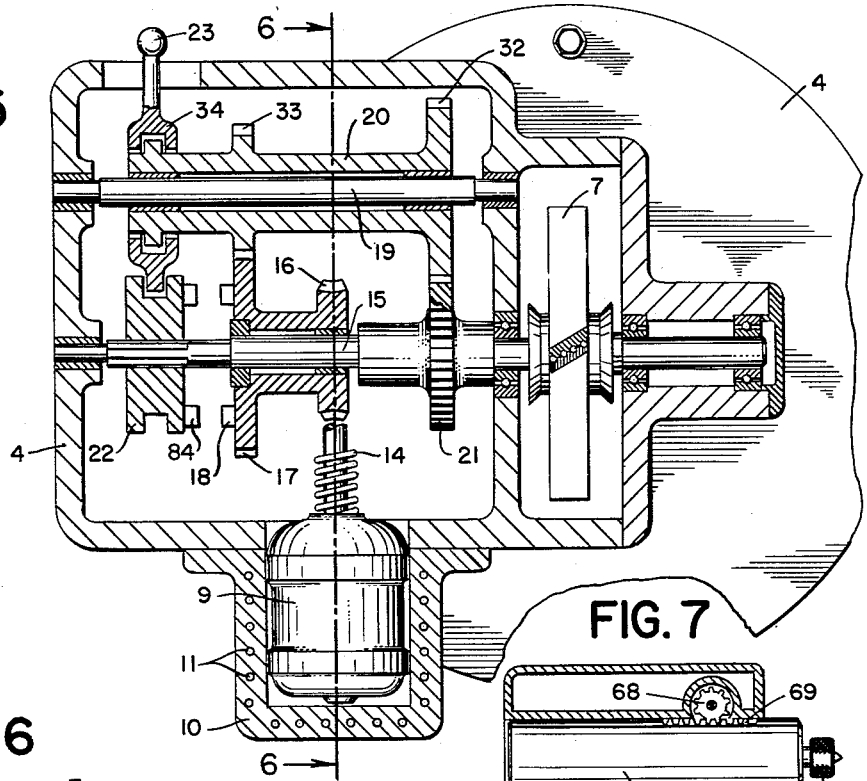
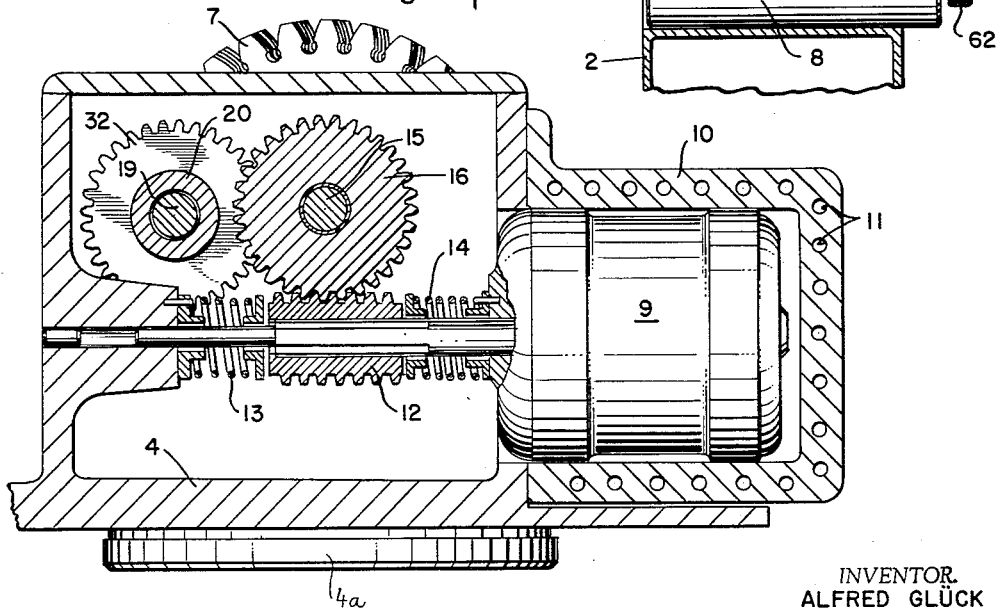
INVENTOR.
ALFRED GLÜCK

United States Patent Office 3,149,533
Patented Sept. 22, 1964

3,149,533
GEAR FINISHING MACHINE
Alfred Glück, Karl-Marx-Stadt, Germany, assignor to VEB Zahnschneidemaschinenfabrik Modul, Karl-Marx-Stadt, Germany
Filed Oct. 19, 1959, Ser. No. 847,131
6 Claims. (Cl. 90—1.6)

This invention relates to a machine for finishing gear teeth and similar parts and in particular to a new and useful machine of this character having a novel drive arrangement permitting rapid acceleration and deceleration of the shaving gear in each direction.

The present invention is directed to a machine which finds particular application for finish machining of pre-cut gears by a shaving process in which the shaving mechanism must be rapidly accelerated and decelerated in either direction. A prime requirement for the operation of such machines is that the abrading tool or wheel be accurately driven and moved in the desired direction to permit satisfactory abrading of the gears which must be accurately finished to dimensions specified within small tolerance limits. In such machines it is usual that gears have to be worked on in rapid succession and it is necessary to provide automatic loading or charging devices, therefore, in order to cut down the operating time of the machine. Since the abrading or shaving operation on the gear teeth is a precision operation the machine must be built very rigidly and the feeding mechanism for the workpiece must be stable and operate smoothly and free of oscillation.

In previous devices of this character, since the rotation of the shaving gear had to be reversed repeatedly and accelerated in each direction to high speeds, it was usual to provide a long gear train from the driving motor to the shaving tool. With such a construction it was necessary to accelerate and decelerate large gear masses in order to operate the machine.

In accordance with the present invention there is provided a novel driving mechanism for the shaving tool which includes a spring biased worm gear affixed to the shaft of the driving motor and which may be urged against its spring biasing in either direction during the startup in order to permit movement of the gear out of mesh with the worm to permit initial absorption of thrust prior to the actual driving of the worm and the machine shaving gear. The driving mechanism constructed in accordance with the present invention is very compact and although it is easily accessible from the top of the machine it is enclosed and is an accident proof construction.

Accordingly, it is an object of this invention to provide an improved machine for finishing mechanical parts such as gears.

A further object of the invention is to provide an abrading machine for gear teeth which is highly accurate and includes a driving mechanism for the shaving member having means for absorbing driving thrusts for acceleration and deceleration in either direction.

It is a further object of the invention to provide a shaving machine which is easily accessible and which has a vibration proof bearing arrangement for the workpiece.

A further object of the invention is to provide a shaving machine including driving means for imparting to the shaving gear the necessary rotation through the shortest possible means in order to avoid loss of power when the direction of rotation is reversed and to provide a vibration free driving gear train in which the several members will not be subjected to excessive wear.

A further object of the invention is to provide a gear tooth shaving machine which is completely enclosed and accident proof.

A further object of the invention is to provide a shaving machine which is simple in design, rugged in construction and economical to manufacture.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

In the drawings:

FIG. 5 is a somewhat schematic horizontal section taken on the line 5—5 of FIG. 1;

FIG. 6 is a section taken on the line 6—6 of FIG. 5; and

FIG. 7 is a somewhat enlarged partial showing of one of the workpiece holding sleeves shown in FIGS. 1 and 3.

Figure 1:
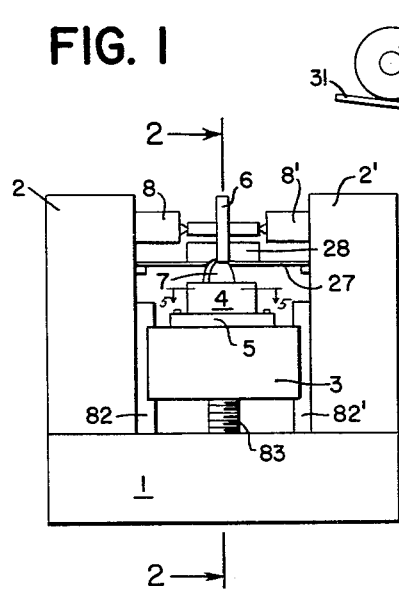
FIG. 1 is a front elevation of a gear tooth finishing machine constructed in accordance with the invention.

Referring to the drawings in particular the invention as embodied therein includes a shaving machine for gear finishing having a base 1, on each end of which is mounted an upstanding standard 2, 2'.

Between the standards 2, 2' is a workpiece supporting base or console 3 which is mounted for vertical reciprocation preferably guided on inwardly extending portions 82, 82' of each of the standards 2, 2'. The outer reciprocable portion of the console 3, of course, may be guided on one side by the standard 2 proper and may also abut against a portion of the other standard 2' in order to achieve a vertical reciprocation.

Figure 2:
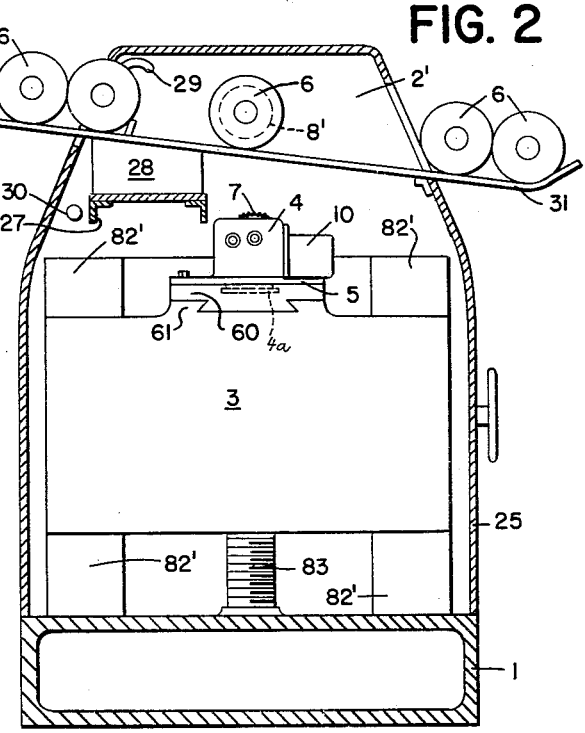
FIG. 2 is a vertical section taken on the line 2—2 of FIG. 1 and indicating means for automatically feeding workpieces to the shaving tool in succession.

A shaving head 4 is mounted on a slide 5 which is vertically reciprocable on the console 3 by conventional means schematically exemplified by a telescopic mechanism 83. Head 4 is rotatable in a substantially horizontal plane with respect to slide 5 by means of a disc-shaped member 4a (FIG. 6) embedded in the slide, as best seen in FIG. 2. The slide 5 includes suitable guide members 60 sliding in runways 61 of the console 3 to permit reciprocation of the shaving head 4 and to permit its own sliding movement on the console 3 (see FIG. 2).

Each of the standards 2, 2' includes inwardly extending and horizontally reciprocable workpiece supporting spindle sleeves 8, 8'. Means are provided to permit adjustment of the sleeves 8, 8' toward and away from each other in order to clamp a workpiece 6 therebetween. By way of example, FIG. 7 is a somewhat schematical showing of sleeve 8 reciprocably guided in a portion of the standard 2. One of the simplest means known in the art is the provision of a rack 69 operable by means of a pinion 68, rotatable from outside. The sleeves 8, 8' may be fitted with conventional centering points as shown at 62. The sleeves 8 are arranged so that the workpiece 6 may be rigidly held above a shaving gear 7, the workpiece and the shaping wheel being freely accessible from the front, rear and top of the device. The workpiece 6 may rotate when acted thereupon by the shaving gear 7. It should be noted that FIGS. 1–3 do not show the shaving gear 7 in an operating position with respect to the workpiece 6; in FIGS. 1 and 3 the former is rotated by about 45 degrees while in FIG. 2 it is shown axially aligned with the latter, for the purpose of better showing the shaving head 4 and its attachments, to be described hereunder.

As seen in FIG. 5 the driving mechanism for the shaving gear 7 includes a two-speed drive motor 9 which may be an electric or hydraulic or other suitable device, which is enclosed in a casing 10. The casing 10 is provided with internal passageways 11 for the circulation of a cooling liquid for the motor as well as means for supplying liquid for cooling the workpiece during the shaving operation. Keyed to the output shaft of the motor 9 is a worm 12 which is centrally biased by means of springs 13 and 14 held at their outer ends by bearing members affixed to the shaft and having their inner ends abutting against the worm 12. The worm 12 rotates with the shaft of the motor 9 but may move back and forth axially thereon as indicated by the arrow in FIG. 6.

The worm 12 is biased centrally into meshing engagement with a worm wheel 16, but upon initial rotation of the worm 12 in either direction it fails to rotate the worm wheel 16 until the initial rotational forces are absorbed by either the spring 13 or the spring 14.

The worm wheel 16 is loosely mounted on a shaft or spindle 15, rigid with a thicker shaft portion which carries the shaving gear 7. The worm wheel 16 is a double gear having a spur gear portion 17 with axially extending coupling teeth 18.

In the position indicated in FIG. 5 the spur gear 17 meshes with a pinion portion 33 of a double gear 20. The double gear 20 has a gear portion 32 at its opposite end which meshes with a gear 21 affixed to the thicker portion of shaft 15. Thus, drive is from motor 9 through worm 12 to wheel 16, from spur gear 17 through pinion 33 of gear 20 and thence, through gear portion 32, to gear 21 affixed to shaft 15.

In accordance with the invention there is provided a switch 23 which is pivotally mounted on a stationary portion of the frame and includes a forked portion 34 which is connected to the double gear 20 to permit axial shifting of the latter on a shaft 19. The switch 23 also includes a portion engaging a coupling member 22 which is splined on the spindle shaft 15 for rotation therewith but may move axially in respect thereto. When the switch 23 is actuated from the position indicated in FIG. 5 the forked portion 34 moves the pinion 33 of the double gear 20 out of engagement with the spur gear 17 and causes the coupling 22 having laterally extending mating coupling portions 84, to engage corresponding portions 18 of the gear 17. The driving arrangement then is through the gear 16 to the coupling 22 which rotates the shaft 15.

The purpose of gears 33, 32 is to act as an intermediary gearing to bring about a reduction to low speed. At the higher rate of revolutions transmitted over the coupling portions 84, 18, however, the double gear 20 should not revolve so as to avoid accelerating the additional mass during the frequent changes in the direction of revolution. Hence the gear 20 with portions 32, 33 is shifted to the right (as seen in FIG. 5) and is automatically disengaged from the respective gears 21, 17 when direct coupling is established between the gear 16 and the shaft 15.

The arrangement permits the driving of the shaving tool 7 by means of the motor 9 through the shortest possible gear train having good efficiency so that it may be driven by a comparatively low horse power motor 9. The arrangement also permits many gear speed driving ratios through either an electric motor or a continuously adjustable hydraulic motor. The gear driving mechanism is such that only the parts which are positively necessary for the transmission of torque rotate at any given time.

When the direction of rotation is to be changed only a few parts which are of light weight and hence low in mass have to be accelerated or decelerated. Any thrust forces produced by this acceleration or deceleration are taken up by the axially movable worm 12. When the motor is started the worm 12 moves in an axial direction out of its meshing engagement with the worm 16 against the action of the spring 13 or 14. The springs are of sufficient torque so that the worm will move out of driving engagement with the worm wheel, and, after the spring initially absorbs the inertial forces, an equilibrium is established to permit the worm to move back into full driving engagement with the worm wheel 16. As the worm wheel 16 starts to rotate the worm 12 it reassumes its normal driving operating position. Such a construction obviates the necessity of providing a brake for the drive motor, hence the gear train is not subjected to thrusts due to the worm gear 12 being axially movable and resiliently mounted. The construction prevents overload of the drive motor 9 which may be likely to occur during any change of direction.

The mechanism also provides a means for absorbing thrusts which may occur during the operation of the shaving gear against the workpiece. Any unusual obstacles which are encountered by the shaving gear 7 are absorbed by the worm 12 and converted into an axial movement by the self-braking property of the worm drive. None of these unusual thrusts are transmitted to the motor.

The gear driving mechanism described permits at least four different speeds in each direction by use of a two-speed motor. Such speed variation has been found to be completely sufficient for all practical purposes.

Figure 3:
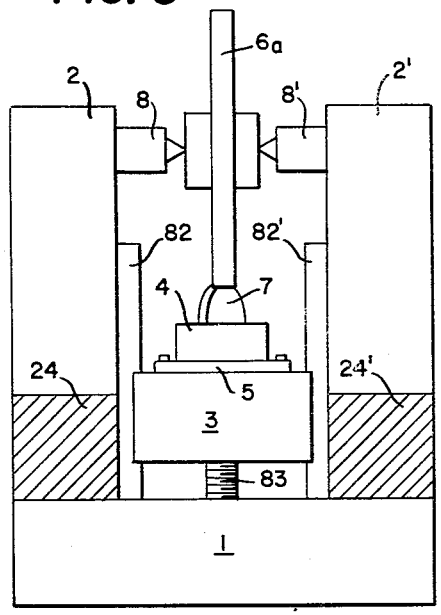
FIG. 3 is a front elevation similar to FIG. 1 but indicating the standards of the machine in an elevated position for machining a large workpiece.
Figure 4:
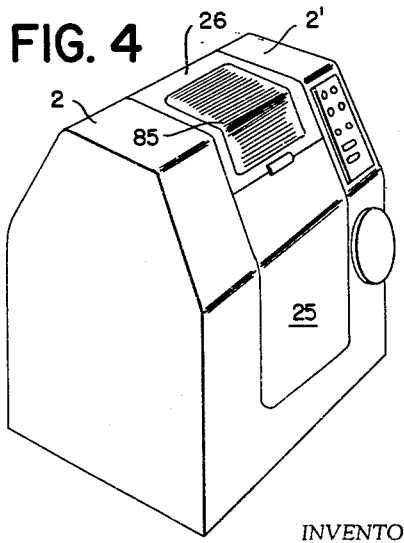
FIG. 4 is a perspective view of the machine completely enclosed and without the automatic workpiece feeding mechanism.

In FIG. 3 the standards 2, 2' are shown elevated on their inner portions or spacers 24, 24' to support a workpiece 6a of large diameter. The machine may be supplied with or without the inner portions or spacers 24. The standards 2, 2' with the base 1 form a substantially U-shaped frame which permits great flexibility in the positioning of the workpiece. The complete device may advantageously be enclosed by a cover piece 25 having a transparent flap 26 which is closed after the workpiece 6 has been placed in the machine (FIG. 4). The flap is provided with a window 85 through which the work can be observed. All means for the control and operation of the automatic finishing procedure may be placed within the interior of the machine frame or cover 25.

In FIG. 2 there is indicated a means for automatically supplying the machine with several workpieces 6. In this embodiment a cross beam member 27 is positioned so that it extends across the machine between the standards 2, 2'. The bridging or cross beam member 27 is provided with a workpiece seating or feeding device 28 (see FIG. 1) which includes a supplying chute 31 (FIG. 2a) which effectively permits the delivery of workpieces 6 down onto the feeding device 28 which is vertically aligned with the workpiece positioning sleeves 8. The supply of workpieces may be controlled by sensing devices 29 and hydraulic or pneumatic pipes or connecting elements 30 which may be suitably mounted on standards 2, 2'. Since the feeding device 28 is always in a fixed connection with the machine frame during operation the short covered pipes 30 are not likely to be subjected to wear. This prevents interruption of the operation and accidents.

A machine which is built as described above may be used without any additional equipment in a production line, or may operate separately as an independent unit completely automatically. The machine according to the invention is not limited to use as a shaving device for the flanks of gear teeth. It may, for instance, also be used as a gear lapping machine.

Thus, the invention provides a machine including an open U frame construction which permits accessibility to the workpiece from either side or the top of the machine. Both the workpiece support and the mounting standards are easily adjustable and means are provided to accurately position the workpiece for operation thereon by the shaving tool.

While a specific embodiment of the invention has been shown and described in detail to illustrate the application of the invention principles, it will be understood that the invention may be embodied otherwise without departing from such principles.

What is claimed is:

1. A gear-shaving machine comprising a unitary machine frame of substantially U-shape open to the front, rear and top, the limbs of said U-shape being formed by a base plate and two rigid standards rigid with and extending upwardly from said base plate, a console attached to said standards and being vertically adjustable therealong, guide means on said standards for the reciprocation of said console, means for supporting a gear-shaving tool for rotation about a horizontal axis, said tool-supporting means being pivotally arranged above said console and including means reciprocable on said console, and means for supporting a workpiece on another horizontal axis coextensive with said tool axis, said workpiece-supporting means being provided at a predetermined height in said standards above said tool axis and including a pair of workpiece-clamping spindles reciprocable between said standards in directions toward and away from each other.

2. A gear-shaving machine according to claim 1, further comprising rectilinear workpiece loading means traversing the machine between said standards, and a cross member interconnecting said standards at a height intermediate said tool and workpiece axes, said loading means being supported by said cross member.

3. A gear-shaving machine according to claim 1, further comprising a drive for said shaving tool including a driving motor having a shaft, a spindle upon which said shaving tool is mounted, combined speed change and clutch means interposed between said shaft and said spindle for selecting a proper rotational speed for said shaving tool in either direction of rotation, a worm on said shaft for rotation thereby, and a worm wheel forming part of said speed change and clutch means, adapted to be driven by said worm.

4. A gear-shaving machine according to claim 3, wherein said worm is axially movable on said shaft, further comprising means on each side of said worm or resiliently biasing the latter toward a central position, whereby upon reversal of direction of said drive excessive load will be effective to move said worm against the action of said biasing means so that the same will be effective to maintain said worm in smooth driving engagement with said speed change and clutch means.

5. A gear-shaving machine according to claim 3, wherein said worm wheel is loosely mounted on said spindle, said speed change and clutch means further comprising a gear train selectively connectable between said worm wheel and said spindle for rotating the latter at a speed different from that of said worm wheel, a coupling member connected for simultaneous rotation with said spindle and axially movable thereon, and means for selectively interengaging said worm wheel with said coupling member, whereby a direct drive is provided between said shaft and said spindle when said worm wheel is engaged with said coupling member while the rotational speed of said shaving tool is changed when said worm wheel is connected to said gear train.

6. A gear-shaving machine according to claim 5, wherein said interengaging means includes means for disconnecting said gear train from said worm wheel and said spindle so as to reduce the rotational masses in said speed change and clutch means.

References Cited in the file of this patent

UNITED STATES PATENTS

| | | |
|---|---|---|
| 1,345,110 | Yungling | June 29, 1920 |
| 1,488,806 | Church | Apr. 1, 1924 |
| 1,614,432 | Meyers | Jan. 11, 1927 |
| 1,683,869 | Copland | Sept. 11, 1928 |
| 2,074,844 | Hill | Mar. 23, 1937 |
| 2,251,442 | Emmons | Aug. 5, 1941 |
| 2,299,290 | Wood | Oct. 20, 1942 |
| 2,317,490 | Simpson | Apr. 27, 1943 |
| 2,322,129 | Hawkins | June 15, 1943 |
| 2,352,557 | Miller | June 27, 1944 |
| 2,386,461 | Hellman | Oct. 9, 1945 |
| 2,393,696 | Kraut et al. | Jan. 29, 1946 |
| 2,453,315 | Harbison | Nov. 9, 1948 |
| 2,497,170 | Hite | Feb. 14, 1950 |
| 2,598,431 | Praeg | May 27, 1952 |
| 2,629,292 | McCullough | Feb. 24, 1953 |
| 2,649,032 | Moncrieff | Aug. 18, 1953 |
| 2,776,604 | Simsack | Jan. 8, 1957 |

FOREIGN PATENTS

| | | |
|---|---|---|
| 272,016 | Switzerland | Feb. 16, 1951 |
| 806,579 | Great Britain | Dec. 31, 1958 |

UNITED STATES PATENT OFFICE
CERTIFICATE OF CORRECTION

Patent No. 3,149,533                        September 22, 1964

Alfred Glück

It is hereby certified that error appears in the above numbered patent requiring correction and that the said Letters Patent should read as corrected below.

Column 5, line 43, for "or" read -- for --.

Signed and sealed this 26th day of January 1965.

(SEAL)
Attest:

ERNEST W. SWIDER                        EDWARD J. BRENNER
Attesting Officer                           Commissioner of Patents